United States Patent Office 3,392,143
Patented July 9, 1968

3,392,143
POLYAMIDE COMPOSITIONS
Fred F. Holub, Scotia, N.Y., assignor to General Electric Company, a corporation of New York
No Drawing. Filed May 15, 1967, Ser. No. 638,633
4 Claims. (Cl. 260—46.5)

ABSTRACT OF THE DISCLOSURE

Polyamides are prepared by reaction of a phthaloyl halide with a mixture of amines comprising an organosilicon diamine and an organic diamine free of silicon. The polyamide products obtained are useful as heat resistant, protective and insulating members.

---

This invention is concerned with polyamide compositions composed of recurring structural units of the formula I 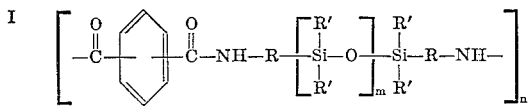

and

II 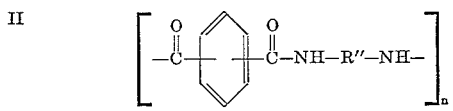

where R is a divalent hydrocarbon radical, R' is a monovalent organic radical, R" is a divalent organic radical, $m$ is a whole number equal to at least 0, and advantageously from 1 to 50 or more, and $n$ is a whole number greater than 1, for example, in excess of 10 up to about 10,000 or more, advantageously 100 to 5,000. The molecular weights of these polymers may range from about 4,000 to 2 or 3 million or more when measured by usual methods, for instance, by light scattering.

The preparation of polyamide resins from isophthaloyl halides or terephthaloyl halides with organic diamines free of silicon is known in the art. These materials have been found to have good heat resistance and good film-forming characteristics. However, when employed for certain electrical applications where high corona resistance is a requirement, it has been found that these polyamide resins do not exhibit the desired level of corona resistance.

Unexpectedly, I have discovered that the incorporation of structural units of Formula I in the polyamide resins so that there are concurrently units of both Formulas I and II, yields polyamide resins which exhibit greatly improved resistance to corona. The polymeric compositions described in this invention can be used in electrical insulation and as protective surface coating and in the formation of heat-resistant films. Solutions of these polyamide resins can be used to coat electrical conductors such as copper, aluminum, alloys of copper and aluminum, etc. Such solutions can also be used to cast films which can be then used as slot liners for motors, as heat-resistant films for packaging, etc. Additionally, the polymeric compositions herein described have great affinity for various metallic surfaces, and thus can be used as structural adhesives; they also can be formed into fibers or other molded products. In conjunction with other natural and synthetic resins such as phenolaldehyde resins, polyesters, polyamides, polyimides, etc., they find many uses for upgrading these latter resins, particularly as to their corona resistance. The polyamide resins can be employed as overcoatings and undercoatings to other resins such as polyvinyl formal resins, polyesters, and the like. Because of the outstanding properties which these materials have and particularly their ease of application, stability, storage capabilities, heat and corona resistance, and excellent adhesion, many other applications will obviously be apparent.

Generally, these polyamide resins can be prepared by forming a mixture of ingredients comprising a phthaloyl halide (or mixtures of such phthaloyl halides) of the formula III 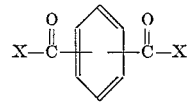

where X is a halogen (e.g., chlorine, bromine, etc.) and a mixture of diamino compounds composed of a diamino siloxane of the formula IV 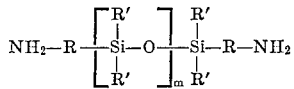

and a diamino compound of the formula

V                  $NH_2$—R"—$NH_2$ where R, R', R", and $m$ have the meanings given above. Also, the phthaloyl compound of Formula III is restricted to isophthaloyl and terephthaloyl halides. When mixtures of these phthaloyl halides are used, the isophthaloyl halide comprises advantageously from 25 to 99 mole percent of the total molar concentration of these reactants. The incorporation of aliphatic diacyl halides, e.g., adipoyl chloride, azelaoyl chloride, succinoyl chloride, etc. with the phthaloyl halide in amounts advantageously up to 65 to 75 mole percent of the total molar concentration of the acyl halides, is not precluded.

The initial reaction between the ingredients can be carried out at from about room or ambient temperatures to 100° C. or more for times ranging from about 5 minutes to 30 minutes or more, up to the time required to give the complete reaction to form the polyamide resin.

Among the divalent radicals which R" in Formula V may be are, for instance, ethylene, trimethylene, isopropylidene, [—$(CH_3)C(CH_3)$—], isobutylene, tetramethylene, pentamethylene, phenylene, toylene, xylylene, biphenylene

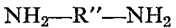

diphenylene methane (—$C_6H_4$—$CH_2$—$C_6H_4$—), diphenylene oxide

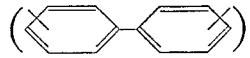

diphenylene sulfone, etc., with valences of the arylene radicals being ortho, meta, or para to each other or to connecting bonds between adjacent arylene radicals. R may be any of the divalent aliphatic hydrocarbon radicals mentioned above for R".

Among the monovalent organic, e.g., hydrocarbon radicals, which R' may be are, for instance, alkyl radicals (e.g., methyl, ethyl, propyl, butyl, isobutyl, decyl, etc.); aryl radicals (e.g., phenyl, naphthyl, biphenyl, etc.); alkaryl radicals (e.g., tolyl, xylyl, ethylphenyl, etc.); aralkyl radicals (e.g., benzyl, phenylethyl, etc.); alkenyl radicals (e.g., vinyl, allyl, methallyl, etc.), cyanoalkyl radicals (e.g., cyanomethyl, cyanoethyl, cyanopropyl, etc.), etc.

The reaction between the amino compound of Formulas IV and V with the phthaloyl halide of Formula III is advantageously carried out in a suitable solvent. Among such solvents may be mentioned, for example, dimethyl formamide, N-methyl-2-pyrrolidone, dimethyl acetamide, etc.

In general one employs approximately from 0.9 to 1.1 total moles of the mixture of the diamino compounds per mole of the phthaloyl halide of Formula III. Advantageously, one can employ approximately equimolar concentrations of the diamines and the phthaloyl halide. After interaction to form the polyamide composition, the solvent is advantageously removed to isolate the polymer which can be used for molding, extruding, or other purposes, or in solution can be used to coat various surfaces for the purposes described previously.

Included among the phthaloyl halides that may be employed are, for instance, isophthaloyl chloride, terephthaloyl chloride, isophthaloyl bromide, etc.

I have found that the diamine of Formula IV can be employed in positive concentrations ranging up to 98 mole percent of the total molar concentration of the two diamines of Formulas IV and V. Good results, as far as corona resistance is concerned, can be obtained when the molar concentration of the siloxane diamine of Formula IV is present in amounts ranging from 2 to 25 mole percent of the total molar concentrations of the latter diamine and the diamine of Formula V.

In order that those skilled in the art may better understand how the present invention may be practiced, the following examples are given by way of illustration and not by way of limitation. All cut-through tests were conducted in the manner described in U.S. 2,936,296. The corona tests (calculated on an equivalent thickness basis) were made according to ASTM D-2275-64T which specifies the electrodes. The test chamber used was at 25° C. and contained $CaCl_2 \cdot 2H_2O$ to maintain the relative humidity between 17-20%. A voltage of 1200 volts was applied at 3160 Hz. (cycles/sec.).

EXAMPLE 1

A polyamide siloxane was prepared by charging to a reaction vessel, under nitrogen, 85.14 grams N,N,-dimethylacetamide, 1.38 grams (0.005 moles) 1,3-bis(4-aminobutyl)-1,1,3,3,-tetramethyldisiloxane, 4.86 grams (0.045 mole) m-phenylene diamine and 7.9 grams pyridine. To the vigorously stirred solution was added 10.15 grams (0.05 mole) isophthaloyl chloride. The temperature rose autogenously to around 123° C. Stirring of the reaction mixture was continued for about 2 hours. The solution was slowly added to about 500 ml. methanol with stirring, and the polymer which precipitated was washed three time with methanol, filtered, and air dried for about 2 hours. This yielded a polyamide resin composed of recurring structural units of the formula VI 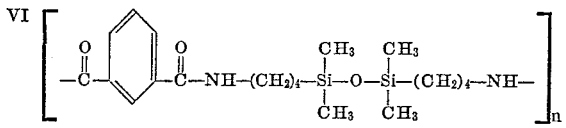

and
VII 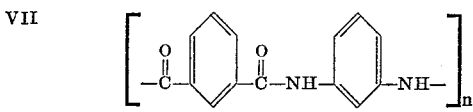

where $n$ is a whole number in excess of 1. A 20% solids solution of this polymer in N-methylpyrrolidone was prepared by dissolving the polymer at a temperature of about 125° C. A film was cast on an aluminum substrate and then heated under nitrogen for about one hour at 225° C. A flexible film was obtained which had a cut through of 285° C.

EXAMPLE 2

Employing a reaction vessel containing nitrogen, 24.54 grams N,N-dimethylacetamide, 0.55 gram (0.002 mole) 1,3 - bis(4-aminobutyl)1,1,3,3-tetramethyldisiloxane, 3.56 grams (0.018 mole) p,p′ - methylenedianiline, and 3,2 grams pyridine were charged to the reaction vessel. To the vigorously stirred solution was added 4.06 grams (0.02 mole) isophthaloylchloride. The temperature rose to about 75° C. and stirring was continued for about two hours. The polymer was precipitated similarly as in Example 1, isolated and dried in vacuum at about 50° C. for approximately two hours. This polymer was composed of recurring structural units of Formula VI and VIII 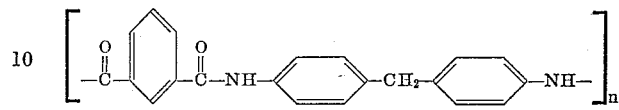

where $n$ is a whole number in excess of 1. A 20% solids solution of the above polymer in N-methylpyrrolidone was prepared and heated to a temperature of about 125° C. A film was cast on an aluminum substrate and the solvent was removed by slowly heating up to about 230° C. under nitrogen where it was maintained at the latter temperature for about one hour. A flexible film was obtained which had a cut through of about 285° C. and a corona resistance about 1.5 times better than a polyamide film made similarly as above but omitting the disiloxane-diamine.

EXAMPLE 3

A polyamide resin was prepared similarly as in Examples 1 and 2 by charging a reaction vessel with 7.92 grams (0.04 mole) p,p′-methylene dianiline, 2.76 grams (0.01 mole) 1,3,-bis(4-aminobutyl)1,1,3,3,-tetramethyldisiloxane, 8 grams pyridine, and 83.5 grams N,N-dimethylacetamide. The mixture was stirred and cooled to about 4° C. at which time 7.61 grams (0.0375 mole) isophthaloyl chloride and 2.54 grams (0.0125 mole) terephthaloyl chloride were added. After addition of these reactants, the temperature of the mixture rose to about 27° C. and remained at this temperature while the mixture was stirred for about one hour. The polymer was isolated in the same manner as was done in Example 3 to give a polymeric composition composed of recurring structural units of Formulas VI, VIII, and IX 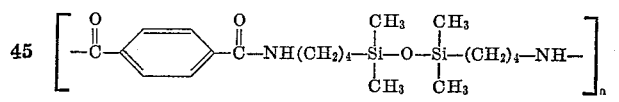

and

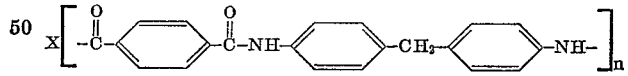

where $n$ is a whole number in excess of 1. This polymer was formed into a 25% solids solution in N-methylpyrrolidone and films were cast on an aluminum substrate after which time the solvent was removed by heating the film at 100° C. for 1 hour, 150° C. for 1 hour, 200° C. for 1 hour, and at 250° C. for 15 minutes. The polyamide film thus obtained was flexible, extremely clear and water white in color, and had a cut-through temperature of 285° C. The corona resistance of this material was 12 times better than the corona resistance of a polyamide resin prepared similarly as in Example 3 except that the tetramethyldisiloxane diamine was omitted.

It will be apparent to those skilled in the art that other diamino compounds free of silicon and other silicon-containing diamino compounds may be employed in conjunction with the reactions described above. Included among the diamino compounds free of silicon which can be used are, for instance, m-phenylene diamine, p-phenylene diamine, methylene dianiline, 4,4′-diaminodiphenyl oxide, 4,4′-diaminodiphenyl sulfone, hexamethylene diamine, etc.

In place of the aminopolysiloxane employed in the foregoing examples, other aminopolysiloxanes may be employed as, for instance,

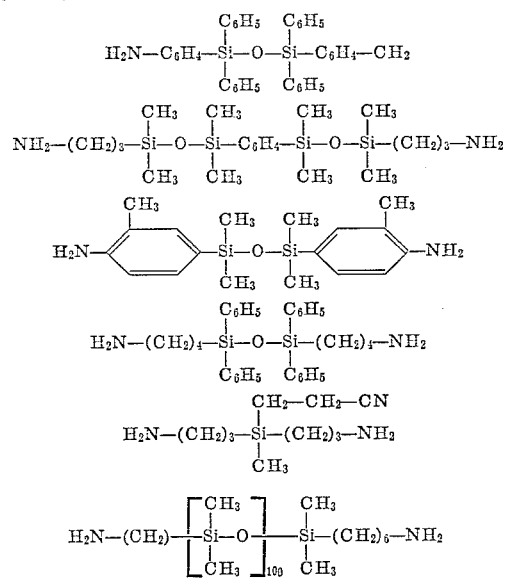

etc.

Many other organopolysiloxanes containing at least two amino groups attached to silicon by the medium of a carbon atom may also be used in the reaction with the other ingredients. Among these may be mentioned organopolysiloxanes corresponding to the formula $$R_a''SiO_{\frac{4-a}{2}}$$

in which R" is an organic radical, for instance, ethyl, propyl, butyl, hexyl, isobutyl, vinyl, phenyl, etc., wherein at least two of the R" groups are substituted with an —NH₂ group and $a$ has a value from 1 to 3, inclusive. These aminopolysiloxanes can be prepared by reducing with hydrogen the corresponding cyano-organopolysiloxane employing as the cyano-organopolysiloxane for the purpose those polymeric and monomeric compounds and methods for preparing those compounds disclosed and claimed in U.S. Patents 3,185,663 and 3,185,719, both issued May 25, 1966, and assigned to the same assignee as the present invention. Additional directions for making the cyanoalkyl polysiloxanes which can be converted to amino alkyl polysiloxanes can be found in British Patent 786,020, published Nov. 6, 1957.

What I claim as new and desire to secure by Letters Patent of the United States is:

1. A composition of matter composed of recurring structural units of the formula (a)

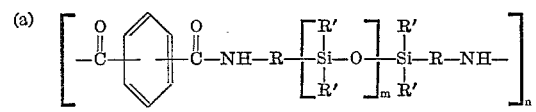

and (b)

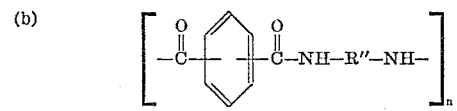

where R is a divalent hydrocarbon radical, R' is a monovalent organic radical, R" is a divalent organic radical, $m$ is a whole number equal to at least 0, and $n$ is a whole number greater than 1, where the carbonyl

groups are meta or para to each other.

2. A composition of matter composed of recurring structural units of the formula (a)

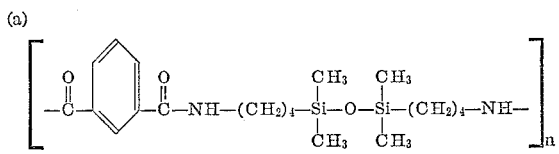

and (b)

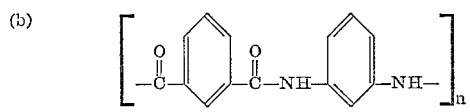

where $n$ is a whole number in excess of 1.

3. A composition of matter composed of recurring structural units of the formula (a)

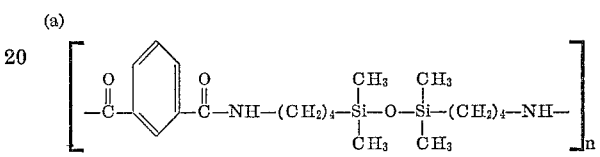

and (b)

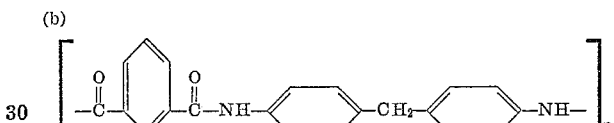

where $n$ is a whole number in excess of 1.

4. A composition of matter composed of recurring structural units of the formula (a)

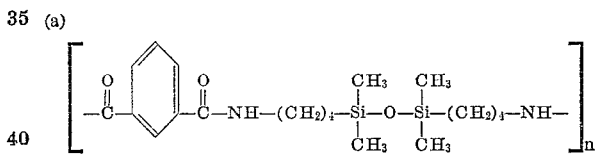

and (b)

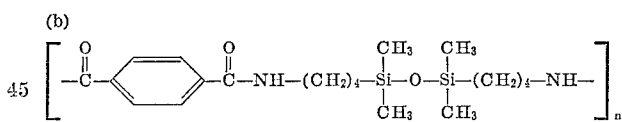

(c)

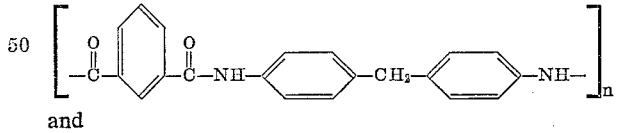

and (d)

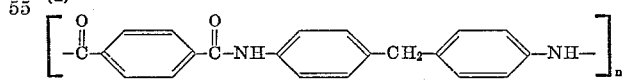

where $n$ is a whole number in excess of 1.

References Cited

UNITED STATES PATENTS

| | | | |
|---|---|---|---|
| 2,754,284 | 7/1956 | Speck | 260—78 |
| 3,049,518 | 8/1962 | Stephens | 260—78 |
| 3,198,771 | 8/1965 | Gabler et al. | 260—78 |
| 3,274,155 | 9/1966 | Saunders et al. | 260—46.5 |
| 3,325,450 | 6/1967 | Holub | 260—46.5 |

FOREIGN PATENTS 618,080   4/1961   Canada.

DONALD E. CZAJA, *Primary Examiner.*

M. I. MARQUIS, *Assistant Examiner.*